(12) United States Patent
Davis et al.

(10) Patent No.: US 9,519,063 B2
(45) Date of Patent: Dec. 13, 2016

(54) SYSTEM AND METHOD FOR TESTING REAL WORLD A-GNSS PERFORMANCE OF A DEVICE

(71) Applicant: Spirent Communications, Inc., Sunnyvale, CA (US)

(72) Inventors: Jason Davis, Tinton Falls, NJ (US); Kunal Shanishchara, Ocean, NJ (US); Ram Garapaty, Middletown, NJ (US); Brock Butler, Ocean, NJ (US)

(73) Assignee: Spirent Communications, Inc., Sunnyvale, CA (US)

( * ) Notice: Subject to any disclaimer, the term of this patent is extended or adjusted under 35 U.S.C. 154(b) by 588 days.

(21) Appl. No.: 13/786,020

(22) Filed: Mar. 5, 2013

(65) Prior Publication Data

US 2014/0253372 A1 Sep. 11, 2014

(51) Int. Cl.
  *G01S 19/23* (2010.01)
(52) U.S. Cl.
  CPC ..................... *G01S 19/23* (2013.01)
(58) Field of Classification Search
  CPC .................. G01S 19/23; G01S 19/25
  USPC ......................... 342/357.62, 357.64
  See application file for complete search history.

(56) References Cited

U.S. PATENT DOCUMENTS

| | | | |
|---|---|---|---|
| 5,761,486 A | 6/1998 | Watanabe et al. |
| 6,208,841 B1 | 3/2001 | Wallace et al. |
| 6,560,459 B1 | 5/2003 | Wong |
| 6,571,082 B1 | 5/2003 | Rahman et al. |
| 6,636,721 B2 | 10/2003 | Threadgill et al. |
| 7,224,941 B2 | 5/2007 | Liu |
| 7,324,588 B2 | 1/2008 | Green et al. |
| 7,349,670 B2 | 3/2008 | Mlinarsky et al. |
| 7,395,060 B2 | 7/2008 | Liu |
| 7,398,056 B1 | 7/2008 | Ebert et al. |
| 7,508,868 B2 | 3/2009 | Chang |
| 7,539,489 B1 | 5/2009 | Alexander |
| 7,555,420 B2 | 6/2009 | Wang et al. |
| 7,606,165 B2 | 10/2009 | Qiu et al. |
| 7,693,082 B2 | 4/2010 | Wright |
| 7,809,404 B2 | 10/2010 | Daniels et al. |
| 8,150,675 B1 | 4/2012 | Ortmanns et al. |
| 8,213,957 B2 | 7/2012 | Bull et al. |

(Continued)

FOREIGN PATENT DOCUMENTS

| | | | | |
|---|---|---|---|---|
| NZ | WO 2011046455 A1 * | 4/2011 | ............ | G01S 19/29 |
| WO | 2010093999 A2 | 8/2010 | | |
| WO | WO 2011046455 A1 * | 4/2011 | | |

OTHER PUBLICATIONS

Geohash, Wikipedia—Geohash 2008 public domain, 5 pgs, accessed Dec. 22, 2010, <http://en.wikipedia.org/wiki/Geohash>.

(Continued)

Primary Examiner — Harry Liu
(74) Attorney, Agent, or Firm — Haynes Beffel & Wolfeld LLP

(57) ABSTRACT

The technology disclosed relates to implementing a novel-testing framework that combines playback of captured GNSS signals with real-time emulation of assisted global navigation satellite system telemetry (abbreviated A-GNSS) in a test session with a mobile device. In particular, it can be used for testing A-GNSS performance of communication devices, navigation systems, telematics and tracking applications.

24 Claims, 9 Drawing Sheets

A-GNSS Real World Environment

(56) References Cited

U.S. PATENT DOCUMENTS

| | | | |
|---|---|---|---|
| 8,223,068 B2* | 7/2012 | Allan | G01S 5/0036 |
| | | | 342/357.23 |
| 8,364,090 B2 | 1/2013 | Ramasamy et al. | |
| 2002/0066055 A1 | 5/2002 | Kim | |
| 2003/0061018 A1 | 3/2003 | Snyder | |
| 2003/0236089 A1 | 12/2003 | Beyme et al. | |
| 2005/0004787 A1 | 1/2005 | Kubischta et al. | |
| 2005/0085223 A1 | 4/2005 | Liu | |
| 2006/0040616 A1 | 2/2006 | Wheatley | |
| 2006/0046658 A1 | 3/2006 | Cruz et al. | |
| 2006/0072466 A1 | 4/2006 | Wang et al. | |
| 2006/0209866 A1 | 9/2006 | Steenkiste et al. | |
| 2006/0223522 A1 | 10/2006 | Guo et al. | |
| 2006/0229018 A1 | 10/2006 | Mlinarsky et al. | |
| 2006/0229019 A1 | 10/2006 | Mlinarsky | |
| 2006/0229020 A1 | 10/2006 | Mlinarsky et al. | |
| 2006/0233111 A1 | 10/2006 | Wright | |
| 2006/0239198 A1 | 10/2006 | Mlinarsky et al. | |
| 2006/0252419 A1 | 11/2006 | Liu | |
| 2006/0264178 A1 | 11/2006 | Noble et al. | |
| 2007/0019769 A1 | 1/2007 | Green et al. | |
| 2007/0257838 A1* | 11/2007 | Cheng | G01S 19/05 |
| | | | 342/357.42 |
| 2008/0056340 A1 | 3/2008 | Foegelle | |
| 2008/0239972 A1 | 10/2008 | Omar | |
| 2008/0287140 A1* | 11/2008 | Lee | H04W 64/00 |
| | | | 455/456.2 |
| 2009/0047925 A1 | 2/2009 | Rahman | |
| 2009/0094492 A1 | 4/2009 | Music et al. | |
| 2009/0305702 A1 | 12/2009 | Toppinen et al. | |
| 2010/0233969 A1 | 9/2010 | Frolik et al. | |
| 2010/0273504 A1 | 10/2010 | Bull et al. | |
| 2010/0304686 A1 | 12/2010 | Kennedy et al. | |
| 2011/0217937 A1 | 9/2011 | Cook | |
| 2011/0230143 A1 | 9/2011 | Lundstrom et al. | |
| 2011/0257923 A1 | 10/2011 | Boulton | |
| 2011/0263215 A1 | 10/2011 | Asplund et al. | |
| 2011/0306306 A1 | 12/2011 | Reed | |
| 2012/0282946 A1* | 11/2012 | Wigren | G01S 5/0257 |
| | | | 455/456.1 |
| 2012/0309323 A1 | 12/2012 | Guo et al. | |
| 2013/0021912 A1 | 1/2013 | Finlow-Bates et al. | |
| 2013/0217418 A1* | 8/2013 | Maurin | H04W 4/02 |
| | | | 455/456.3 |
| 2014/0024318 A1 | 1/2014 | Sevindik et al. | |
| 2015/0065165 A1* | 3/2015 | Zhang | G01S 19/48 |
| | | | 455/456.1 |

OTHER PUBLICATIONS

Algorithm for Finding Nearby Points?—Stack Overflow, http://stackoverflow.com/questions/838344/algorithm-for-finding-nearby-points, accessed Dec. 22, 2010, 3 pp.

Butler, Brock, Playing Nice—LNS and Hybrid location technologies, EETlmes, Dec. 8, 2009.

Kojo, Seawind: a Wireless Network Emulator, Proceedings of 11th GI/ITG Conference of Measuring, Modelling and Evaluation of Computer and Communication Systems, 2001, 16 pages.

CiteSeerX—Seawind: a Wireless Network Emulator, 2001, 2 pages, http://citeseerx.ist.psu.edu/viewdoc/summary?doi=10.1.1.25.3281.

GNSS Product Design, INS: Integrated Navigation Systems, GNSS Solutions. Retrieved on Sep. 21, 2012 at 8:06am. Retrieved from the Internet <http://inavsystems.com/index_files?Page607.htm>.

Global Positioning System. Wikipedia, the Free Encyclopedia. last modified on Nov. 6, 2012, retrieved on Nov. 9, 2012. Retrieved from the internet <http://en.wikipedia.org/w/index.php?title=Global_Positioning_System&oildid=521739076>.

Proximity Searching with GeoHash, 4 pps, accessed Dec. 22, 2010 at http://www.synchrosinteractive.com/blog/1-software/38-geohash.

Eppstein, David, Geometry in Action, Cartography and Geographic Information Systems, accessed Dec. 22, 2010 at http://www.ics.uci.edu/~eppstein/gina/carto.html.

* cited by examiner

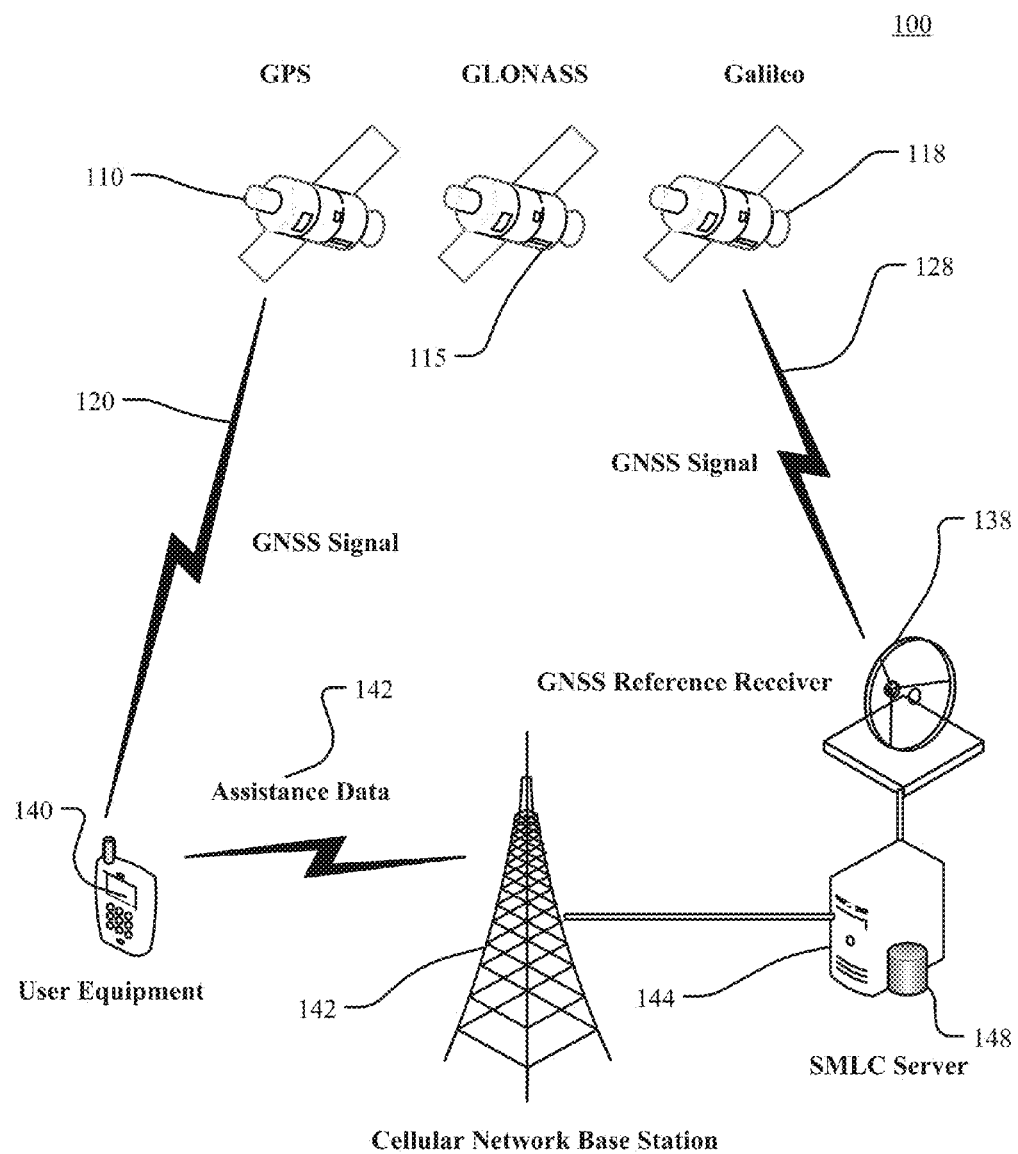
Fig. 1 – A-GNSS Real World Environment

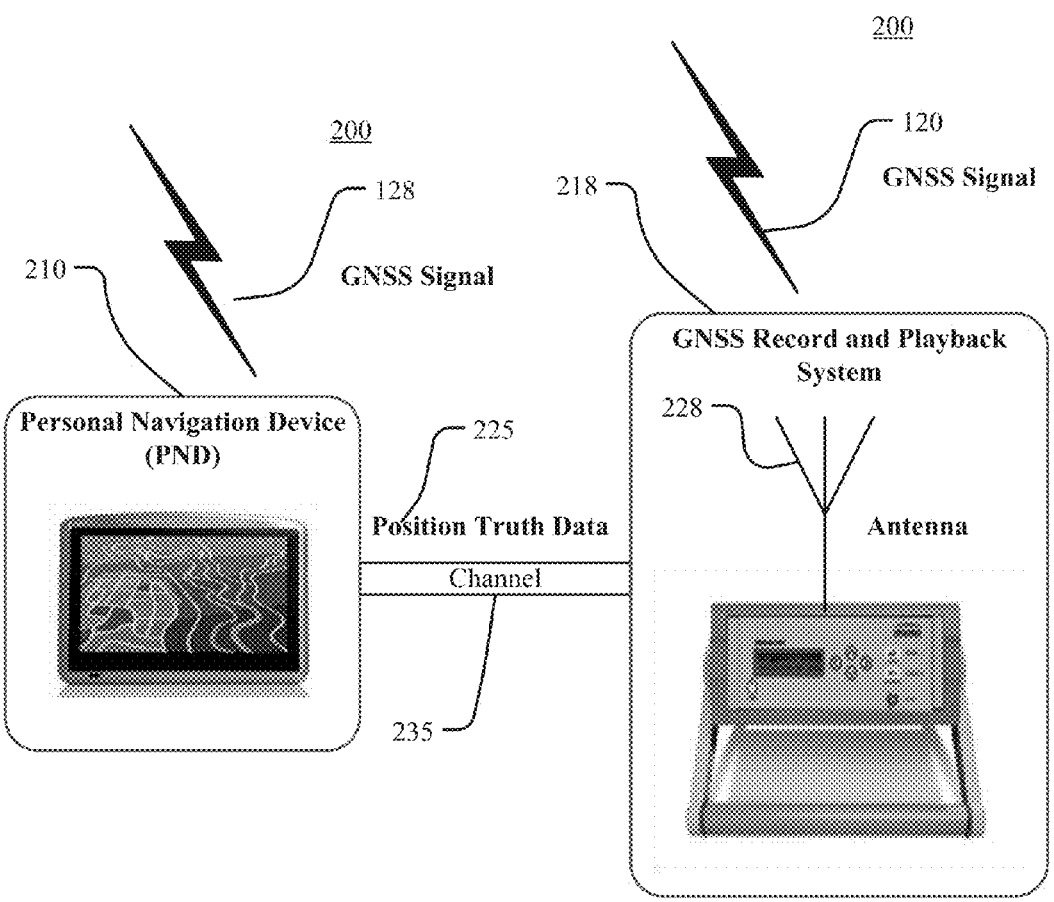
Fig. 2 – Recording GNSS Signal Spectrum in conjunction with PND during a Drive

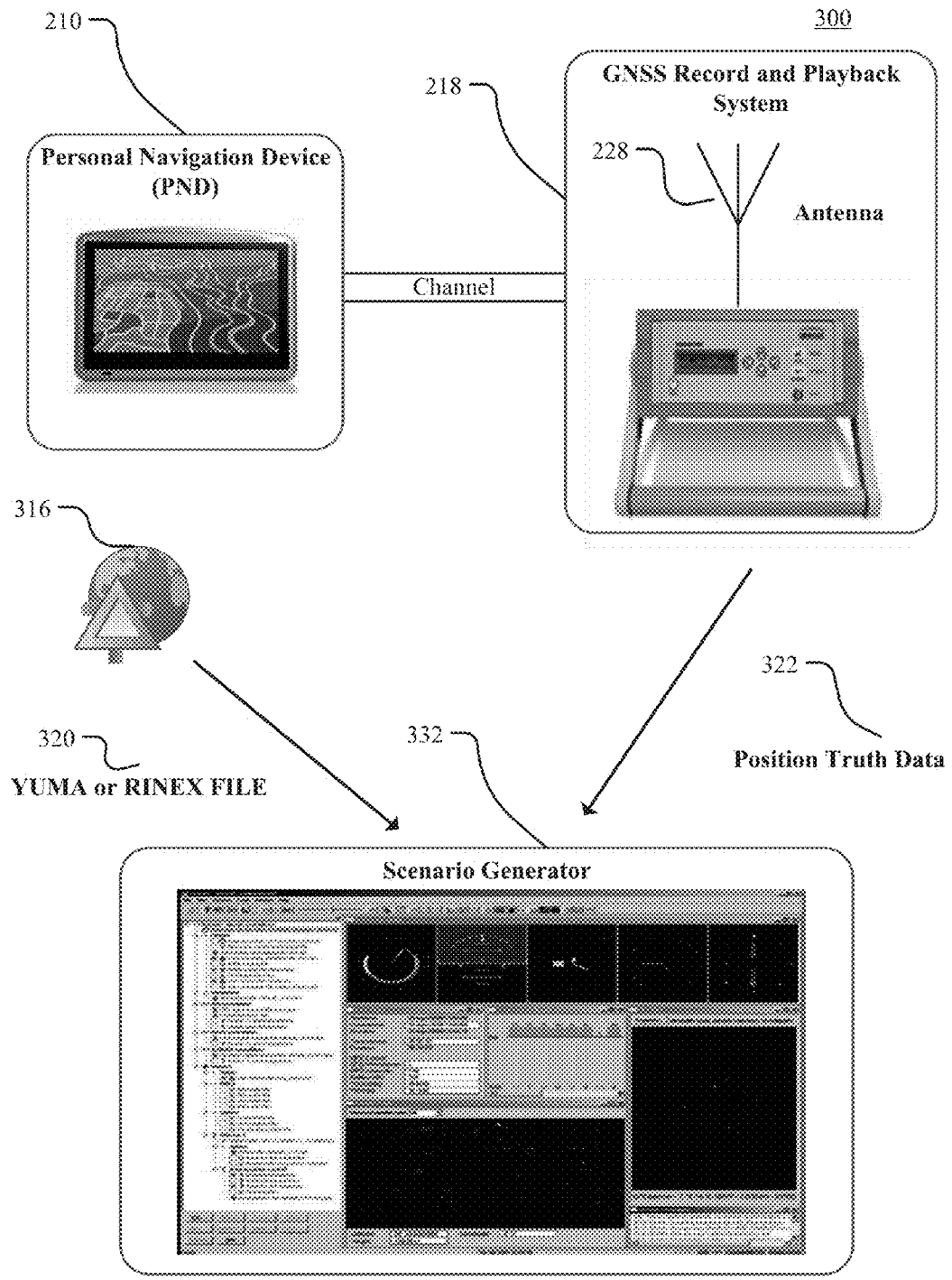
Fig. 3 – Scenario Generation

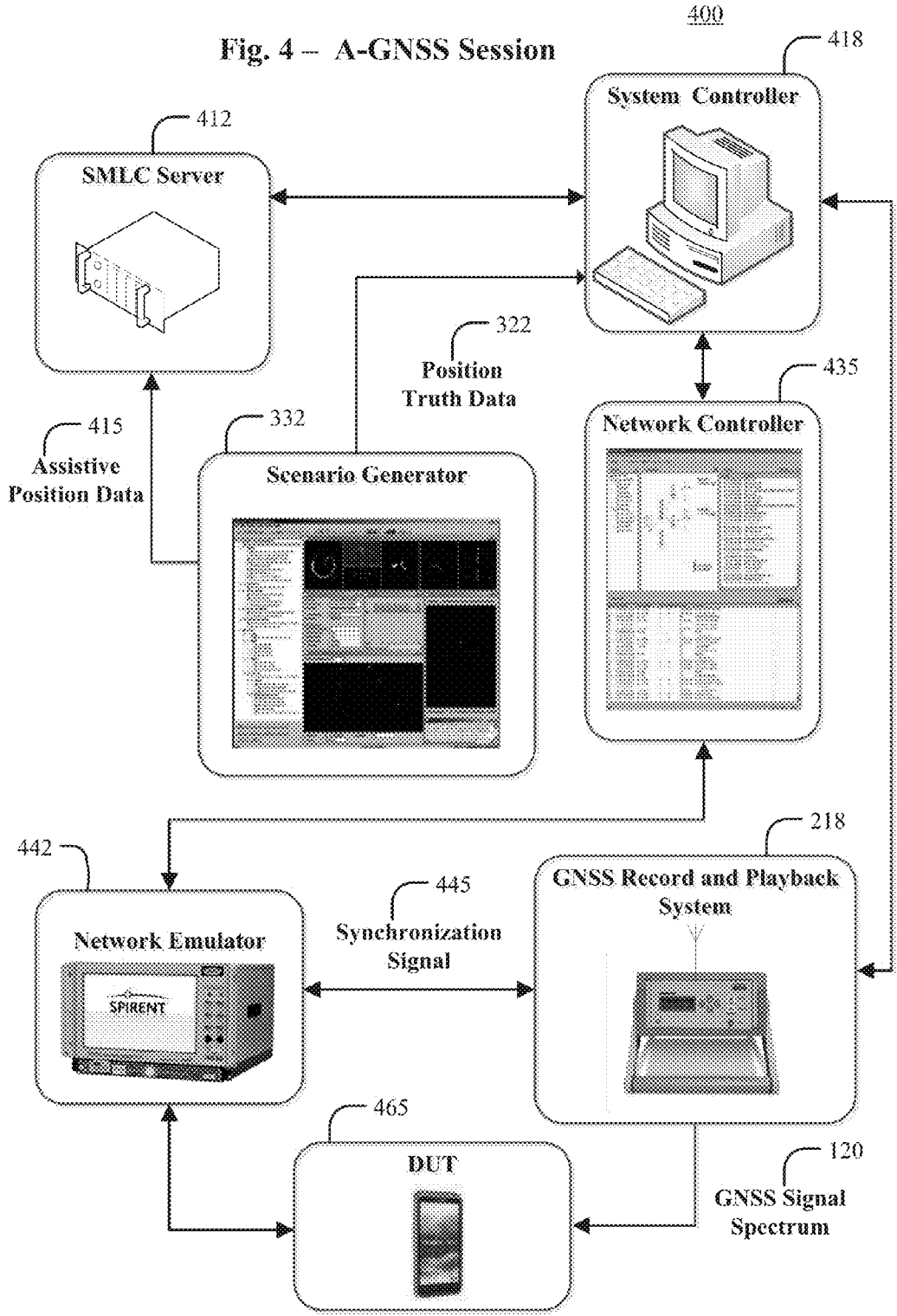
Fig. 4 – A-GNSS Session

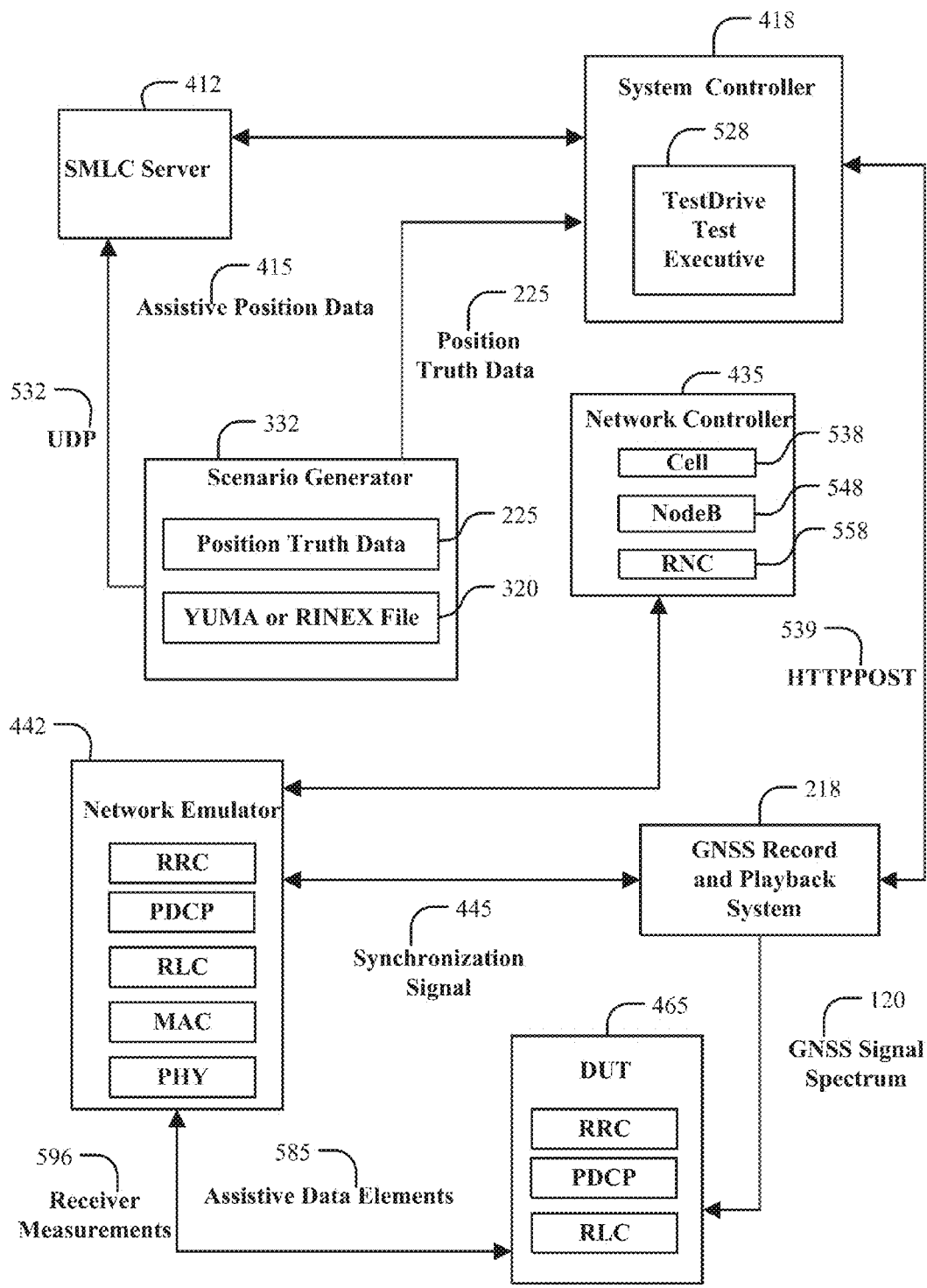

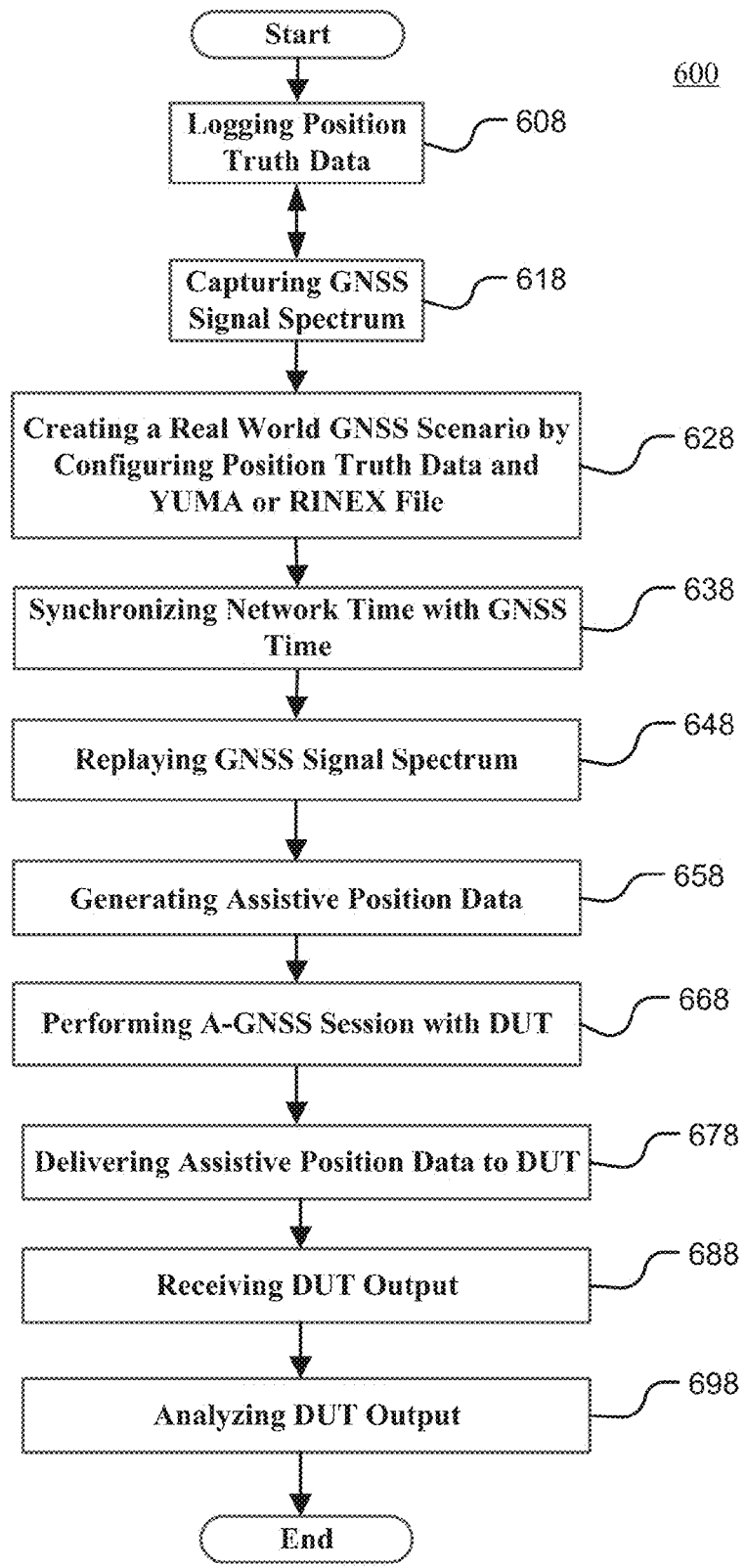
Fig. 6 – A-GNSS Session Flowchart

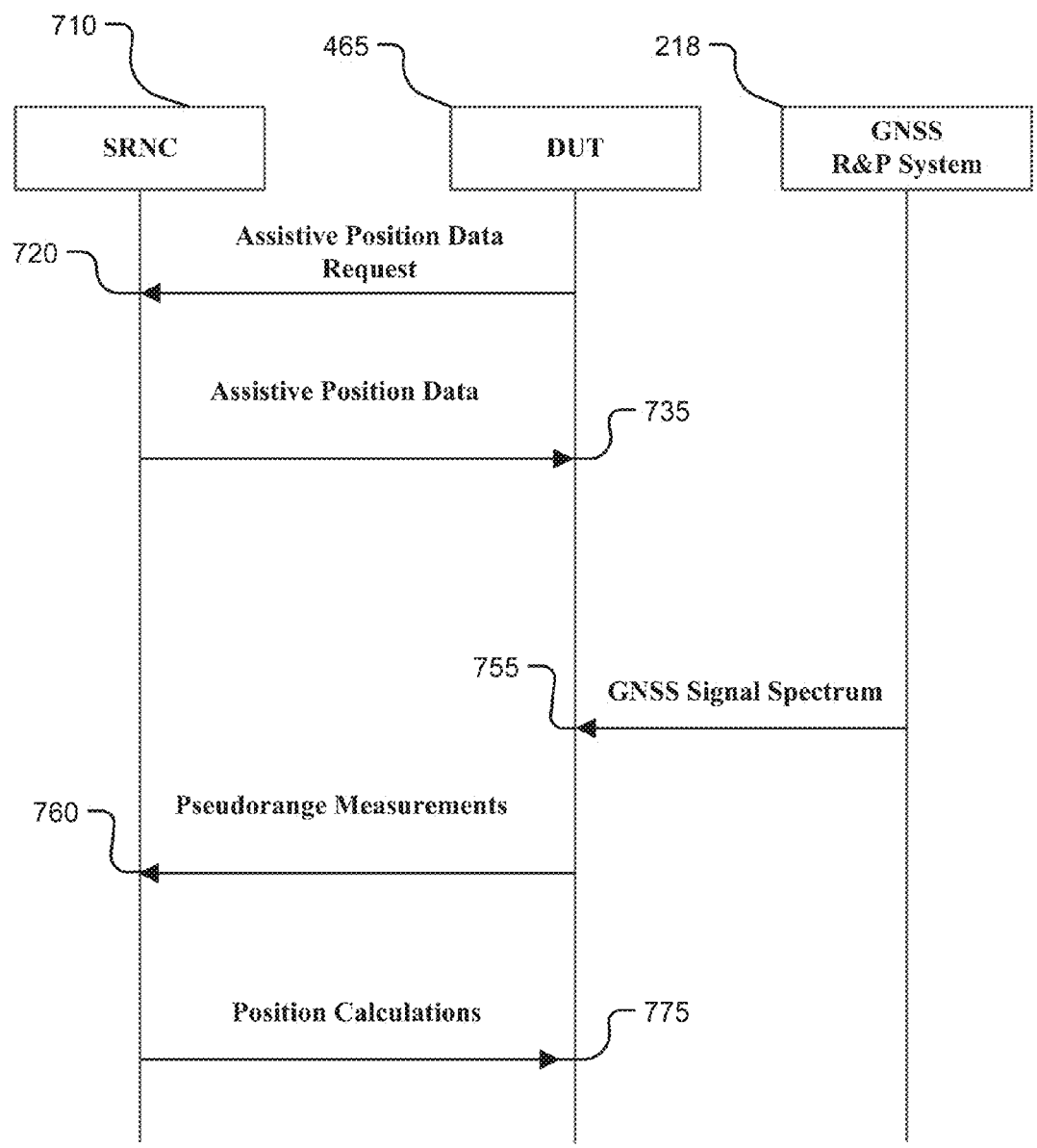
Fig. 7 – A-GNSS Session Message Exchange Chart for UEA Mode

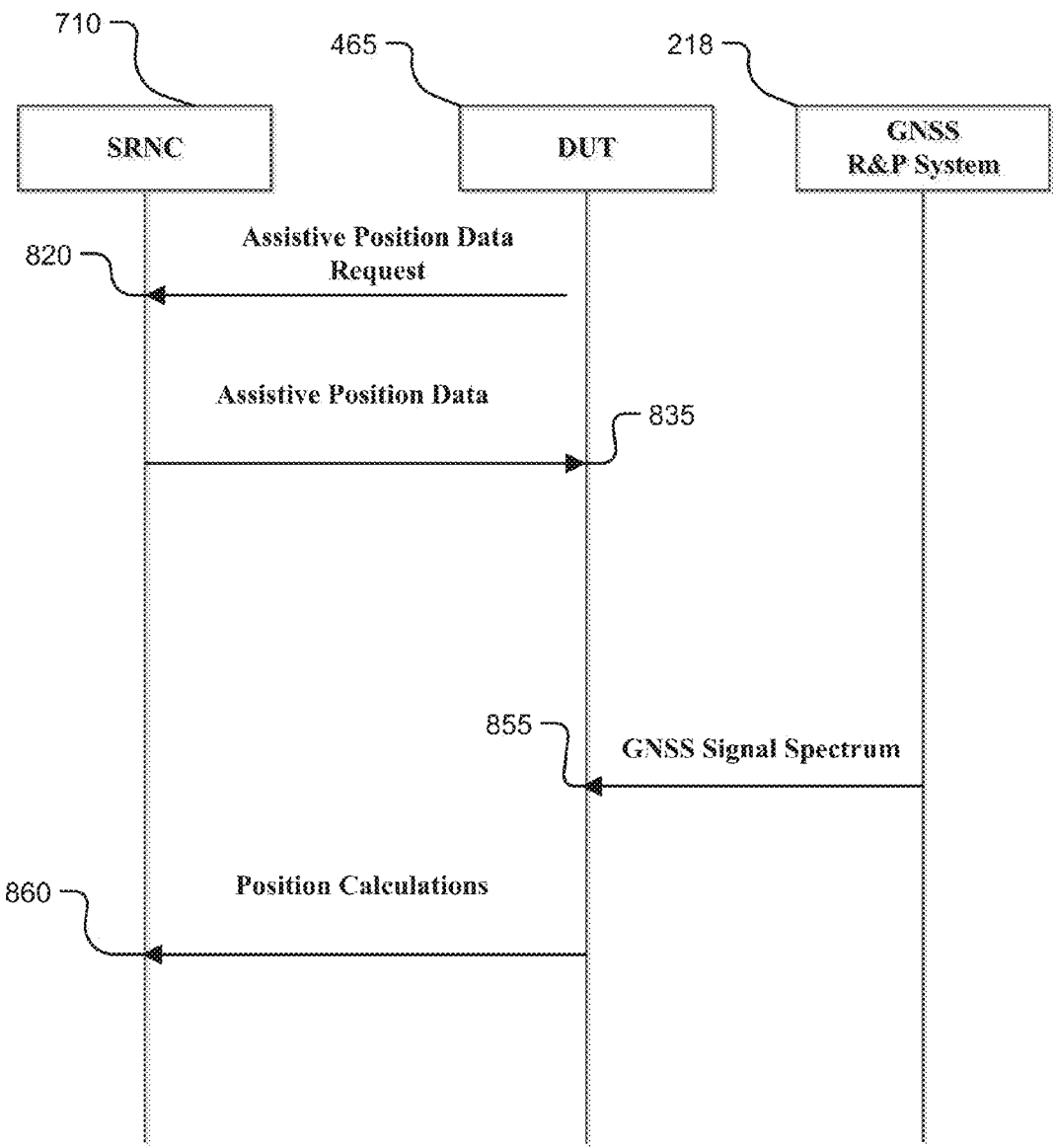
Fig. 8 – A-GNSS Session Message Exchange Chart for UEB Mode

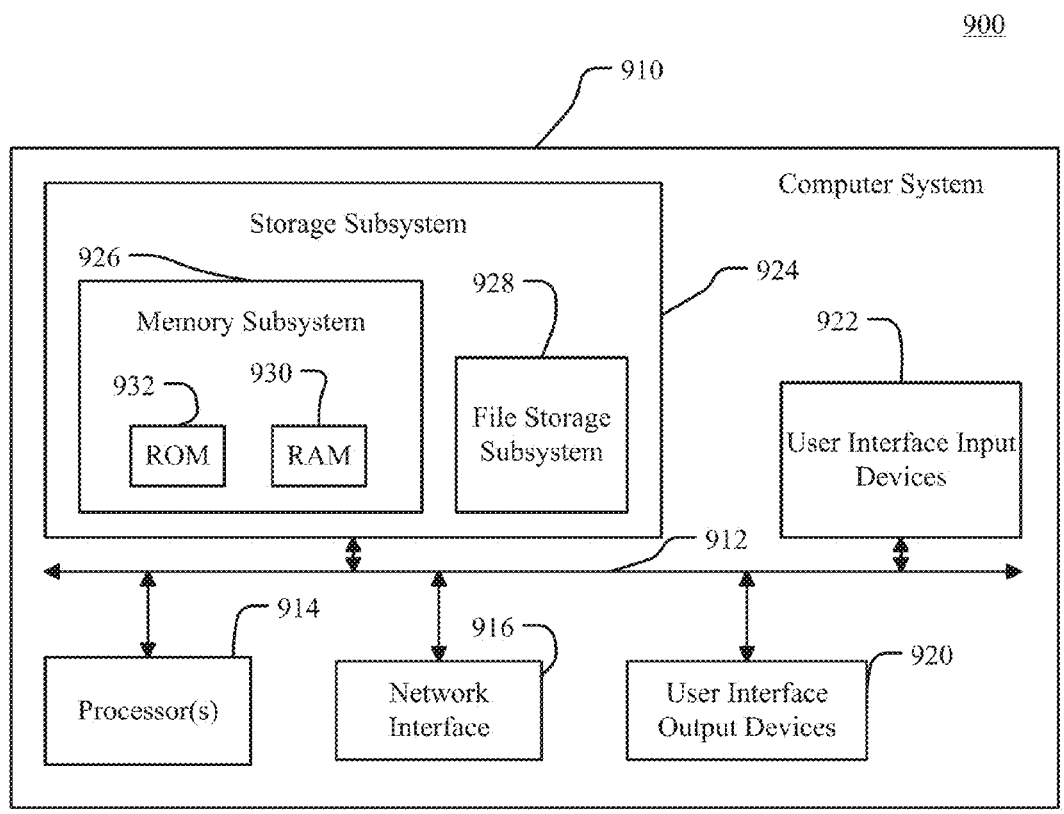
Fig. 9 – Computer System

SYSTEM AND METHOD FOR TESTING REAL WORLD A-GNSS PERFORMANCE OF A DEVICE

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed inventions.

The technology disclosed relates to implementing a novel testing framework that combines playback of captured GNSS signals with real-time emulation of assisted global navigation satellite system telemetry (abbreviated A-GNSS) in a test session with a mobile device. In particular, it can be used for testing A-GNSS performance of communication devices, navigation systems, telematics and tracking applications.

With the rise in location-based services (abbreviated LBS) applications and the need to meet enhanced 911 (abbreviated E911) requirements, there has been a rapid growth in the number of mobile cellular devices supporting A-GNSS. End-user satisfaction with LBS is highly dependent on the real-world performance of the technologies that enable them.

Current industry-defined A-GNSS test methodologies include employing user-provided or user-defined data to create real-world environment for testing the performance of a device. Such methodologies may not provide the real-time data necessary to truly and accurately test the real-world performance of a device.

An opportunity arises to provide users an improved test framework that combines real-world GNSS signals and A-GNSS testing. Methods and systems capable of bench testing environmental field conditions, accounting for vagaries of the real world, and identifying the characteristics that influence device performance may result.

SUMMARY

The technology disclosed relates to implementing a novel testing framework that combines playback of captured GNSS signals with real-time emulation of assisted global navigation satellite system telemetry (abbreviated A-GNSS) in a test session with a mobile device. In particular, it can be used for testing A-GNSS performance of communication devices, navigation systems, telematics and tracking applications.

The technology disclosed can generate valuable system performance data to enhance the understanding of various components affecting the performance of a location system. The technology disclosed can be used as a platform to meet various testing needs such as over-the-air A-GNSS testing, signaling conformance, and radio frequency (abbreviated RF) performance testing.

The technology disclosed can allow users to test A-GNSS-enabled mobile devices in a laboratory. It can provide accurate and repeatable test results, allowing for performance problems to be detected, isolated, and corrected in the shortest possible time. More particularly, the technology disclosed can be used for product development, design verification tests, quality assurances, product evaluations, and interoperability tests. It can eliminate the need for expensive, labor-intensive internally created test systems and can drastically reduce the time spent performing field tests whose conditions cannot be controlled or repeated.

The technology disclosed can provide a complete integrated system for evaluating the performance of location-capable user equipment (abbreviated UE) employing Global System for Mobile Communications (abbreviated GSM), General Packet Radio Service (abbreviated GPRS), Wideband Code Division Multiple Access (abbreviated W-CDMA) or Long Term Evolution (abbreviated LTE). In other implementations, it can include all the test instruments and control software required to accurately emulate the bi-directional end-to-end connection between a network and UE.

Other aspects and advantages of the present invention can be seen on review of the drawings, the detailed description and the claims, which follow.

BRIEF DESCRIPTION OF THE DRAWINGS

The included drawings are for illustrative purposes and serve only to provide examples of possible structures and process operations for one or more implementations of this disclosure. These drawings in no way limit any changes in form and detail that may be made by one skilled in the art without departing from the spirit and scope of this disclosure. A more complete understanding of the subject matter may be derived by referring to the detailed description and claims when considered in conjunction with the following figures, wherein like reference numbers refer to similar elements throughout the figures.

FIG. 1 illustrates a real world environment to be simulated, which includes at least one GNSS satellite constellation and at least one cellular network base station that conducts A-GNSS sessions with a UE.

FIG. 2 is a block diagram of one implementation of GNSS signal spectrum recording during a drive.

FIG. 3 is a block diagram of one implementation of feeding the position truth data logged from the GNSS record and playback system and YUMA or RINEX file to a scenario generator.

FIG. 4 is a block diagram of one implementation of a system that replays recorded GNSS signal spectrum from the drive to a device under test (DUT) and emulates an A-GNSS session between a cellular network base station and the DUT.

FIG. 5 is a software block diagram of one implementation of some software components of an A-GNSS session using the replay and emulation system.

FIG. 6 is a flow chart of one implementation of conducting an A-GNSS session using the replay and emulation system.

FIG. 7 is a message exchange chart of one implementation of conducting an A-GNSS session using the replay and emulation system in UE assisted mode.

FIG. 8 is a message exchange chart of one implementation of conducting an A-GNSS session using the replay and emulation system in UE based mode.

FIG. 9 is a high-level block diagram of a computer system that can be used to run software components in an A-GNSS session.

DETAILED DESCRIPTION

The following detailed description is made with reference to the figures. Sample implementations are described to illustrate the technology disclosed, not to limit its scope, which is defined by the claims. Those of ordinary skill in the art will recognize a variety of equivalent variations on the description that follows.

The technology disclosed can allow wireless service providers, equipment manufacturers, and developers to evaluate A-GNSS enabled products relative to industry standards and user-defined test conditions. The technology disclosed can support industry standard test cases such as 3rd Generation Partnership Project (abbreviated 3GPP) TS 37.571-1 (sections 5, 6, 7, 8, 9), Open Mobile Alliance (abbreviated OMA) Enabler Test Specification for SUPL v1.0, OMA Enabler Test Specification for SUPL v2.0, 37.571-2 (sections 4), 3GPP TS 51.010 Mobile Station Conformance Specification (Section 70.7, 70.8, 70.9, and 70.11), and CTIA OTA, as well as custom test cases.

FIG. 1 illustrates a real world A-GNSS environment 100 to be simulated, which includes at least one GNSS satellite constellation 110, 115, or 118 and at least one cellular network base station 142 that can conduct an A-GNSS session with the UE 140. The cellular network base station 142 can simultaneously capture signals 120 and 128 from the same satellite constellations 110, 115, and 118 as captured by the UE 140.

The GNSS can include satellite systems such as the Global Positioning System (abbreviated GPS) 110, Galileo 115 and the Global'naya Navigatsionnaya Sputnikovaya Sistema (abbreviated GLONASS) 118 to provide worldwide precise positioning, navigation and timing for both terrestrial and earth-orbiting vehicles.

The cellular network base station 142 can include at-least one SMLC server 144 with a GNSS reference receiver 138 that can download satellite information to generate assistance data 132 which can be stored in a database 148. The assistance data 142 can include message data from GNSS satellite constellation 110, 115, and 118 such as almanac and ephemeris that provide information about satellite location, altitude, health, and orbit patterns.

The assistance data 142 can be passed to the UE 140 over wireless communication channel provided by cellular networks such as Code Division Multiple Access (abbreviated CDMA), Global System for Mobile Communications (abbreviated GSM), Universal Mobile Telecommunications System (abbreviated UMTS) and Long Term Evolution (abbreviated LTE). The cellular network base station 142 can employ signaling protocols like Radio Resource Location Services Protocol (abbreviated RRLP), Radio Resource Control (abbreviated RRC), LTE Positioning Protocol (LPP), TIA IS-801, or SUPL 1.0 or SUPL 2.0, and air interfaces such as CDMA, WCDMA, GSM, GPRS or LTE for transporting the assistance data 142.

The technology disclosed can enable faster initial acquisition of satellite constellations 110, 115, and 118 and increase GNSS receiver sensitivity and position fixes accuracy of the UE 140. The cellular network base station 142 can perform complex position calculations by employing the assistant sever 148, allowing substantial decrease in processing time and freeing the processor of the UE 140 to service other functions.

GNSS Data Collection

FIG. 2 is a block diagram of one implementation of recording GNSS signal 120 during a drive 200. Data collection drive 200 can include using a device with a GNSS receiver such as personal navigation device 210 (abbreviated PND) and a GNSS signal record and playback system 218 such as Spirent GSS6400 product. The PND 210 can be connected to the GNSS record and playback system 218 over a communication channel 235 such as Wireless, Bluetooth, RS-232 cable or USB. The drive 200 can include concurrently implementing the GNSS record and playback system 218 and the PND 210.

The GNSS receiver of the PND 210 and the GNSS record and playback system 218 can capture signals from the same GNSS satellite constellations. GNSS signals 120 and 128 can include the time of transmission of the signal and the satellite position at the time of signal transmission. The PND 210 can use this information to compute its location and generate position truth data 225 using navigation equations. PND units with wide area information server (abbreviated WAIS) can typically produce position truth data within three meters of a precise location. More sophisticated differential PND units (abbreviated DGPS) can provide even more accurate position truth data.

The position truth data 225 can be printable ASCII text describing he navigation state of the PND 210. It can be transmitted in the form of sentences and each sentence can start with a $, a two letter talker ID, a three-letter sentence ID, followed by a number of data fields separated by commas, and terminated by an optional checksum, and a carriage return/line feed.

The GNSS record and playback system 218 use an active antenna 228 to record and replay signals from GNSS satellite constellations 110, 115, and 118. It can gather data from the field and replay it back in a laboratory with optimal fidelity and performance. The signals 120 and 128 captured by the GNSS record and playback system can include real world fades, multipath, and in-band interference along with direct signals from GNSS satellite constellations 110, 115, and 118.

The GNSS signal spectrum 120 recorded by the GNSS record and playback system 218 includes whatever noise, interference and multipathing are present during a drive. The recorded GNSS signal spectrum 120 can be converted from digital samples back to analog signals in the intermediate frequency signal and then up converted to GNSS frequencies that can be replayed to a DUT. The playback system can controllably attenuate the replayed GNSS signal spectrum from 1 dB to 31 dB. In some implementations, attenuation can be more finely controlled, in increments of 0.5 dB or 0.1 dB. A wider dynamic range of attenuation from about 0 to 40 dB, or 0 to 50 dB, or 0 to 60 dB can be used in various implementations.

The PND 210 and GNSS record and playback system 218 can be deployed in the field under real-world conditions to record the position truth data 225 and the GNSS signal spectrum 120. The PND 210 can be taken into open and subjected to dynamic motion while navigating under GNSS signal spectrum 120 to record position truth data 225.

In some implementations, the GNSS record and playback system 218 can interleave the recorded location of the position truth data 225 with the GNSS signal spectrum 120 by matching the storage sectors of the position truth data 225 with the correlated storage sectors used to store the GNSS signal spectrum 120. In other implementations, the GNSS record and playback system 218 can match the time stamp data of the position truth data 225 with the time stamp data of the GNSS signal spectrum 120 to correlate the recorded location of the position truth data 225 with the GNSS signal spectrum 120.

The two signals can be used by test systems for subjecting a DUT to real world GNSS environment by replaying motion, signal characteristics, atmospheric, and other effects of GNSS satellite constellations 110, 115, or 118 coherently with the position truth data 225. The coherent playback of the two signals can provide a DUT with A-GNSS data reflecting the simulated position of the DUT even before the DUT completes a warm-start and estimates its location.

GNSS data collection can also be a two-step process in which the GNSS signal spectrum 120 is recorded during the drive 200, and the position truth data 225 is separately collected in a laboratory by connecting the PND 210 to the recorded GNSS signal spectrum 120. This implementation reduces the likelihood of errors in the GNSS data collection since only one antenna is used during the drive 200.

FIG. 3 is a block diagram 300 of one implementation of feeding the position truth data 225 and YUMA or RINEX file 320 to a scenario generator 332 such as Spirent SimGEN product. The scenario generator 332 can create a real world GNSS scenario by loading the position truth data 225 logged from the GNSS record and playback system 218 and YUMA or RINEX file from the United States Coast Guard Navigation Centre website 316 at www.navcen.uscg.gov/gps/almanacs.htm. In some implementations, the PND 210 can construct the RINEX file when measuring the RF environment.

The position truth data 225 can be transported from the GNSS record and playback system 218 to the scenario generator 332 through local area network (abbreviated LAN), wireless Area Network (abbreviated WLAN) or a data storage device such as USB, memory cards, etc. Once the GNSS scenario has been defined and stored, it can be recreated precisely time and time again.

The GNSS scenario can include real world aspects such as multipath effects, motion profiles, electromagnetic interference, loss of satellite signal and etc. The scenario generator 332 can quantify and compare GNSS receiver performance for design verification, production test in manufacturing, comparative evaluation, statistical data-generation through extended and repeated tests, and incoming products test.

A-GNSS Session

FIG. 4 is a block diagram of one implementation of a system that replays the recorded GNSS signal spectrum from the drive 200 to a DUT 465 and emulates an A-GNSS session 400 between the cellular network base station 142 and UE 140.

The A-GNSS session 400 can include a serving mobile location center (abbreviated SMLC) server 412 like Spirent SMLC Emulator (abbreviated SSE) product, system controller in a desktop personal computer (PC) 418, scenario generator 318 such as Spirent SimGEN product, network controller 435 like Spirent AirAccess HS product, network emulator 442 such as Spirent SR 3420 product, GNSS record and playback system 218 as Spirent GSS6400 product, and a DUT 465. Test components 412, 418, 332, and 435 can be consolidated into a single desktop PC.

The A-GNSS session 400 can perform functionality tests such as standards based testing, A-GNSS RF minimum performance tests, A-GNSS signaling conformance via control plane, A-GNSS signaling conformance via user plane (SUPL1.0, SUPL2.0), CTIA A-GNSS over the air (abbreviated OTA) conformance, and operator acceptance performance tests. The A-GNSS session 400 can measure performance and protocol conformance of A-GNSS capable devices over a variety of protocols and transport layers including RRLP over GSM/GPRS control plane, RRC over W-CDMA control plane, LPP over LTE control plane, PreSUPL over GSM/GPRS and W-CDMA user plane, SUPLv1.0 and v2.0 over GSM and W-CDMA user plane, SUPL 2.0 over LTE user plane, etc.

The scenario generator 332 can generate assistive position data 415 by reading the position truth data 225 and YUMA or RINEX file 320 for measuring the position accuracy of the DUT 465. The assistive position data 415 can be correlated with the position truth data 225 by having the same system time as the position truth data 225 interleaved with the GNSS signal spectrum 120. In some implementations, the time of satellite signal acquisition by the GNSS receiver that generated the position truth data 225 can match the GNSS reference time of the assistive position data 415. The DUT 465 can use the assistive position data 415 reflecting its simulated position to acquire GNSS spectrum 468 and estimate its position fix before completing a warm-start. The position or navigated trajectory reported by the DUT 465 on an electronic map can be tested to match the map database.

The SMLC server 412 can allow full control of the assistive position data 415 during the A-GNSS session 400. In some implementations, it can work in conjunction with the network emulator 442 to provide assistive position data 415 to the DUT 465.

The network emulator 442 can establish a wireless radio communication link with the DUT 465. It can emulate all network components required to establish mobile calls, exchange necessary messages for A-GNSS session 400, and retrieve measurements from the DUT 465. In some implementations, it can support all of the air interfaces and frequency bands employed by the DUT 465 such as WCDMA, GSM, GPRS, UMTS, CDMA, and LTE. The network emulator 442 can also trigger a synchronization signal 445 towards the GNSS record and playback system 218 to establish a single time base for the A-GNSS session 400. The synchronization signal 445 can set up a timing synchronization between the network time and GNSS time.

The GNSS record and playback system 218 can provide the GNSS downlink signal spectrum 120 to the DUT 465 during the A-GNSS session 400. In some implementations, it can provide the pre-recorded I/Q measurements taken during the drive 200. In other implementations, the record and playback utility can be performed by two separate systems, a record system and a playback system. The GNSS record and playback system 218 can be combined with other hardware, such as interference generators and inertial sensor test equipment producing test setups that can fully exercise an automotive navigation system. It can give complete repeatability, control and exact knowledge of the signal stimulating the GNSS receiver of a DUT.

The system controller 418 can regulate all equipment in the system once the A-GNSS session 400 is started, reducing the need for user intervention and increasing the repeatability of tests. It can allow saving and testing customized test sessions at any time and test parameters to be modified for customized test scenarios, making user interaction with the A-GNSS session 400 intuitive and easy-to-use.

The system controller 418 can—load appropriate configuration file into the SMLC server 412, support user-specified positioning protocols, initialize network controller 435 to configure the network emulator 442. In some implementations, it can store and recall results data from a test that has been previously executed, providing the ability to view and analyze results. In other implementations, it can allow debugging of unexpected problems by providing tools such as event and instrumental communication and protocol logs.

The system controller 418 can load I/Q files from the GNSS record and playback system 218 and synchronize all the software and hardware to deliver assistive position data 415. It can initiate positioning session using user-specified protocols, compare measurements made by the DUT 465 to simulated positions and do statistical analysis of the DUT 465. In some implementations, it can determine the accuracy of the calculated position by comparing the reported position with the simulated position. The reported position can be obtained from the SMLC server 412 in UEA mode and from the DUT 465 in UEB mode, whereas the simulated position can be obtained from the scenario generator 332.

The A-GNSS session can operate in two modes, UE-Assisted mode (abbreviated UEA) and UE-Based mode (abbreviated UEB). In UEA mode, the DUT 465 can request the assistive position data 415 from the SMLC server 412 and use it to acquire the GNSS signal spectrum 120. The DUT 465 can then use the acquired GNSS signal spectrum 120 to make pseudorange measurements, which are approximations of distance between the GNSS satellite constellation 110, 115, or 118 and the DUT 465. The SMLC server 412 can then use the pseudorange measurements to calculate the position of the DUT 465 and relay it to the DUT 465. In UEB mode, the DUT 465 follows the same protocol as in the UEA mode except it makes its own position calculations and sends them to the SMLC sever 412 if required.

FIG. 5 is a software block diagram 500 of one implementation of some software components of A-GNSS session 400 using the replay and emulation system. The SMLC server 412 can calculate the network-based location of the DUT 465 and configure various elements of assistive position data 415 such as reference time, reference location, acquisition assistance, etc. The SMLC server 412 can transport the assistive data elements 585 to the DUT 465 through the network emulator 442.

The SMLC server 412 can simulate the core functionality of an actual SMLC, allowing the DUT 465 to request and receive assistive position data 415 through standard 3GPP signaling for managing the processing associated with the location of the DUT 465. In some implementations, it can manage the content of message exchanged between the SMLC and the UE. It can also implement a wide range of message formats and call flows.

The network controller 435 can include an independent cell 538, nodeB 548 and radio network controller (abbreviated RNC) 558. The cell 538, nodeB 548 and RNC 558 along with network emulator 442 can create the radio environment necessary for running the A-GNSS session 400. In some implementations, the network controller 435 can provide software protocols such as RRC and RLC to verify the ability of DUT 465 to interoperate within a network. The behavior of each cell 538 can be individually configured, enabling thorough testing of cell selection/reselection scenarios. The node-B 548 can transmit on a different WCDMA carrier allowing true multi-frequency testing such as cell selection/reselection and call processing. In some implementations, it can support all of the air interfaces and frequency bands employed by the DUT 465 such as WCDMA, GSM, GPRS, UMTS, CDMA, LTE, etc.

The scenario generator 332 can broadcast the assistive position data 415 to the SMLC server 412 over user datagram protocol (abbreviated UDP) protocol 522. The SMLC server 412 can deliver the assistive position data 415 on demand to the DUT 465 upon command from the system controller 418.

The scenario generator 332 can have a YUMA or RINEX file 320-to-assistive position data 415-conversion utility. It can also use the position, velocity, time (abbreviated PVT) packet and satellite visibility information contained within the position truth data 225 and GNSS signal spectrum 225 to reflect motion and signal variations of the pre-recorded environmental conditions. In some implementations, the assistive position data 415 can be generated by employing the utility to convert the logged position truth data 225 into "*.umt" motion files. The motion file can contain motion commands at 100 ms intervals and the utility can generate a command file to control satellite visibility and receiver power level. The scenario generator 318 can construct a motion trajectory of the vehicle used in the drive 200 using a suite of commands. The scenario simulator 318 can import YUMA or RINEX file 320 to simulate the orbits of the GNSS satellite constellations 110, 115, or 118.

The network controller 435 can initialize and control network emulator 442. It can act as a real-time state machine serving a live network. Its emulation can include detailed network elements and realistic Internet Protocol (abbreviated IP) anchor points. It can provide a complete and realistic network for testing the DUT 465. In some implementations, it can link the DUT 465 to an Ethernet connection for applications testing using both simple IP and mobile IP (abbreviated MoIP). The network emulator 544 can use protocols such as RRC and RLC to exchange with the DUT 465: assistive data elements 585, receiver measurements 596, and other positioning-related information.

The system controller 418 can include TestDrive Test Executive (abbreviated TTE) software 528 that can provide a user-friendly interface for defining the assistive position data 415. In some implementations, TTE 528 can coordinate the synchronization of the assistive position data 415 with I/Q measurements taken by the GNSS record and playback system 228. TTE 528 can automate the A-GNSS session 400 by fully configuring the system equipment, stepping through the test sequences and conditions, processing, and storing the results. In some implementations, it can select the correct equipment and necessary system hardware, write software to automate test sequences, log test results, print reports, and replicate test conditions. In other implementations, it can configure a variety of call flows including Mobile-Originated Location Requests (MO-LR), Network-Induced Location Requests (NI-LR), and Mobile-Terminated Location Requests (MT-LR).

FIG. 6 is a flow chart 600 of one implementation of conducting A-GNSS session 400 using the replay and emulation system. Other implementations may perform the steps in different orders and/or with different or additional steps than the ones illustrated in FIG. 6. For convenience, this flowchart is described with reference to the system that carries out a method. The system is not necessarily part of the method.

After logging the position truth data at step 608 and capturing GNSS signal spectrum at step 618, the scenario generator creates a real world GNSS scenario by configuring the position truth data along with YUMA or RINEX file at step 628. At step 638, the network emulator time is synchronized with the GNSS time. The previously captured real GNSS signal spectrum is replayed to the DUT through a GNSS recorded and playback system at step 648. At step 658, the scenario generator generates the assistive position data from the position truth data and YUMA or RINEX file. Following this, a positioning session is performed with the DUT at step 668 and the assistive position data is sent to the DUT at step 678 if required by the DUT. The DUT takes GNSS measurements and produces an output, which is received by the system controller at step 688 and analyzed at step 698.

In some implementations, a GNSS data collection drive can include using a Garmin GPS product and a Spirent GSS6400 product to capture the position truth data and correlated GNSS signal spectrum at the Golden Gate Bridge. Spirent SimGEN product can use the position truth data and YUMA or RINEX file to create a real-world GNSS scenario for testing the location accuracy and TTFF of an iPhone. SimGEN can generate the appropriate assistive position data and send it to Spirent SMLC Server (abbreviated SSE). SSE can configure the relevant assistive data elements from the assistive position data and deliver them to the iPhone using Spirent SR323 network emulator.

The iPhone can use the assistive data elements to acquire the GNSS signal spectrum from GSS6400 and then report its measurements to a system controller PC using protocols such as Radio Resource Location Services Protocol (abbreviated RRLP), Radio Resource Control (abbreviated RRC), LTE Positioning Protocol (LPP), or SUPL 1.0 or SUPL 2.0. In some implementations, if the reported latitude and longitude measurements match the latitude and longitude of the Golden Gate Bridge or are within a tolerance band set by the user, the test can be considered to have passed on location accuracy criteria. In other implementations, if the reported TTFF of the iPhone is with the threshold set by the user, the test can be considered to have passed on TTFF criteria.

FIG. 7 is a message exchange chart of one implementation of A-GNSS session 400 in UEA mode. The network emulator 442 includes a serving radio network controller (abbreviated SRNC) 710 that terminates mobile link layer communication to the DUT 465. The DUT 465 sends an assistive position data request to the SRNC 710 at exchange 720. In response, SRNC 710 sends the computed assistive position data to the DUT 465 at exchange 735. Following this, the DUT uses the received assistive position data to receive the GNSS signal spectrum 120 from the GNSS record and playback system 218 at exchange 755. The DUT uses the received GNSS signal spectrum 120 to make pseudorange measurements and report them to the SRNC 710 at exchange 760. SRNC 710 applies these pseudorange measurements to make position calculations for the DUT 465 and sends them to the DUT at exchange 775.

FIG. 8 is a message exchange chart of one implementation of A-GNSS session 400 in UEB mode. The network emulator 442 includes a serving radio network controller (abbreviated SRNC) 710 that terminates mobile link layer communication to the DUT 465. The DUT 465 sends an assistive position data request to the SRNC 710 at exchange 820. In response, SRNC 710 sends the computed assistive position data to the DUT 465 at exchange 835. Following this, the DUT uses the received assistive position data to receive the GNSS signal spectrum 120 from the GNSS record and playback system 218 at exchange 855. The DUT makes pseudorange measurements using the captured GNSS signal spectrum 718 and applies them to calculate its position. At exchange 860, the DUT sends the position calculations to SRNC 710.

FIG. 9 is a block diagram of an example computer system, according to one implementation. Computer system 910 typically includes at least one processor 914 that communicates with a number of peripheral devices via bus subsystem 912. These peripheral devices may include a storage subsystem 924 including, for example, memory devices and a file storage subsystem, user interface input devices 922, user interface output devices 920, and a network interface subsystem 916. The input and output devices allow user interaction with computer system 910. Network interface subsystem 916 provides an interface to outside networks, including an interface to network emulator 436, and is coupled via network emulator 436 to corresponding interface devices in other computer systems.

User interface input devices 922 may include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 910 or onto network emulator 436.

User interface output devices 920 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide a non-visual display such as audio output devices. In general, use of the term "output device" is intended to include all possible types of devices and ways to output information from computer system 910 to the user or to another machine or computer system.

Storage subsystem 924 stores programming and data constructs that provide the functionality of some or all of the modules and methods described herein. These software modules are generally executed by processor 914 alone or in combination with other processors.

Memory 926 used in the storage subsystem can include a number of memories including a main random access memory (RAM) 930 for storage of instructions and data during program execution and a read only memory (ROM) 932 in which fixed instructions are stored. A file storage subsystem 929 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 929 in the storage subsystem 624, or in other machines accessible by the processor.

Bus subsystem 912 provides a mechanism for letting the various components and subsystems of computer system 910 communicate with each other as intended. Although bus subsystem 912 is shown schematically as a single bus, alternative implementations of the bus subsystem may use multiple busses.

Computer system 910 can be of varying types including a workstation, server, computing cluster, blade server, server farm, or any other data processing system or computing device. Due to the ever-changing nature of computers and networks, the description of computer system 910 depicted in FIG. 9 is intended only as one example. Many other configurations of computer system 910 are possible having more or fewer components than the computer system depicted in FIG. 9.

Some Particular Implementations

While the present invention is disclosed by reference to the preferred implementations and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

In one implementation, a method can include replaying to a DUT a recorded GNSS signal spectrum previously captured during a drive, which is correlated with position truth data that represents a true position of a GNSS receiver that captured the GNSS signal during the drive and performing an A-GNSS session with the DUT during the replaying, including generating assistive position data from the position truth data correlated with the replaying.

This method and other implementations of the technology disclosed can each optionally include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features identified as implementations.

The method can include converting the recorded GNSS signal spectrum from digital samples to an intermediate frequency signal and then up converting the intermediate frequency to GNSS frequencies that are replayed to the DUT. The method can further include exchanging a synchronization signal between a GNSS record and playback system and a network emulator to maintain the correlation between the replay and the A-GNSS session.

The method can also include matching the position truth data's recorded location with the correlated true position of the GNSS record and playback system by retrieving the position truth data from storage sectors interleaved with other storage sectors used to store the GNSS signal spectrum captured during the drive. It can further include matching the position truth data's recorded location with the correlated true position of the GNSS record and playback system by retrieving the position truth data accompanied by first time stamps, retrieving the GNSS signal spectrum accompanied by second time stamps and correlating the first and second time stamps.

The method can include capturing assistive position data from a scenario generator via a SMLC server that configures corresponding assistive position data elements and delivers them to the DUT during the A-GNSS session.

Other implementations may include a non-transitory computer readable storage medium storing instructions executable by a processor to perform a method as described above. Yet another implementation may include a system including memory and one or more processors operable to execute instructions, stored in the memory, to perform a method as described above.

In another implementation, a method can include capturing radio frequency signals from GNSS constellation satellites while following a route and logging correlated position truth data along the route from a GNSS tracker and replaying to a DUT the captured radio frequency signals while conducting an A-GNSS session with the DUT, including supplying to the DUT assistive position data generated from the correlated position truth data.

Other implementations may include a non-transitory computer readable storage medium storing instructions executable by a processor to perform a method as described above. Yet another implementation may include a system including memory and one or more processors operable to execute instructions, stored in the memory, to perform a method as described above.

In yet another implementation, a method can include testing operational performance of a DUT in laboratory by replaying to the DUT previously recorded GNSS signal spectrum captured during a drive along with supplying generated assistive position data that matches a vehicle trajectory captured during the drive.

Other implementations may include a non-transitory computer readable storage medium storing instructions executable by a processor to perform a method as described above. Yet another implementation may include a system including memory and one or more processors operable to execute instructions, stored in the memory, to perform a method as described above.

While the present invention is disclosed by reference to the preferred implementations and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. A test device-implemented method for testing A-GNSS performance of a user equipment, the method including:
   replaying to a device under test (abbreviated DUT) a recorded GNSS signal spectrum previously captured during a drive, which is correlated with position truth data that represents a true position of a GNSS receiver that captured the GNSS signal during the drive; and
   performing an A-GNSS session with the DUT during the replaying, including generating assistive position data from the position truth data correlated with the replaying.

2. A test device-implemented method for testing A-GNSS performance of a user equipment, the method including:
   capturing radio frequency signals from GNSS constellation satellites while following a route and logging correlated position truth data along the route from a GNSS tracker;
   replaying to a device under test (abbreviated DUT) the captured radio frequency signals while conducting an A-GNSS session with the DUT, including supplying to the DUT assistive position data generated from the correlated position truth data.

3. A test device-implemented method for testing a user equipment in a simulated A-GNSS environment, the method including:
   testing operational performance a device under test (abbreviated DUT) in laboratory by replaying to the DUT previously recorded GNSS signal spectrum captured during a drive along with supplying generated assistive position data that matches a vehicle trajectory captured during the drive.

4. The method of claim 1 further including:
   converting the recorded GNSS signal spectrum from digital samples to an intermediate frequency signal and then up converting the intermediate frequency to GNSS frequencies that are replayed to the DUT.

5. The method of claim 1 further including:
   exchanging a synchronization signal between a GNSS record and playback system and a network emulator to maintain the correlation between the replay and the A-GNSS session.

6. The method of claim 1 further including:
   matching the position truth data's recorded location with the correlated true position of the GNSS record and playback system by retrieving the position truth data from storage sectors interleaved with other storage sectors used to store the GNSS signal spectrum captured during the drive.

7. The method of claim 1 further including:
   matching the position truth data's recorded location with the correlated true position of the GNSS record and playback system by retrieving the position truth data accompanied by first time stamps, retrieving the GNSS signal spectrum accompanied by second time stamps and correlating the first and second time stamps.

8. The method of claim 1 further including:
capturing assistive position data from a scenario generator that creates a real world GNSS scenario from recorded position truth data via a service mobile location center (abbreviated SMLC) server that configures corresponding assistive position data elements and delivers them to the DUT during the A-GNSS session.

9. A system for testing A-GNSS performance of a user equipment, the system including:
a processor;
code stored in memory coupled to the processor, which when executed on a processor:
 replays to a device under test (abbreviated DUT) a recorded GNSS signal spectrum previously captured during a drive, which is correlated with position truth data that represents a true position of a GNSS receiver that captured the GNSS signal during the drive; and
 performs an A-GNSS session with DUT during the replaying, including generating assistive position data from the position truth data correlated with the replaying.

10. A system for testing A-GNSS performance of a user equipment, the system including:
a processor;
code stored in memory coupled to the processor, which when executed on a processor:
 captures radio frequency signals from GNSS constellation satellites while following a route and logging correlated position truth data along the route from a GNSS receiver;
 replays to a device under test (abbreviated DUT) the captured radio frequency signals while conducting an A-GNSS session with the DUT, including supplying to the DUT correlated assistive position data generated from the correlated position truth data.

11. A system for testing a user equipment in a simulated A-GNSS environment, the system including:
a processor;
code stored in memory coupled to the processor, which when executed on a processor:
 tests operational performance a device under test (abbreviated DUT) in laboratory by replaying to the DUT previously captured GNSS signal spectrum captured during a drive along with generated position assistive data that matches a vehicle trajectory captured during the drive.

12. The system of claim 8 further including:
converting the recorded GNSS signal spectrum from digital samples to an intermediate frequency signal and then up converting the intermediate frequency to GNSS frequencies that are replayed to the DUT.

13. The system of claim 8 further including:
exchanging a synchronization signal between a GNSS record and playback system and a network emulator to maintain the correlation between the replay and the A GNSS session.

14. The system of claim 8 further including:
matching the position truth data's recorded location with the correlated true position of the GNSS record and playback system by retrieving the position truth data from storage sectors interleaved with other storage sectors used to store the GNSS signal spectrum captured during the drive.

15. The system of claim 8 further including:
matching the position truth data's recorded location with the correlated true position of the GNSS record and playback system by retrieving the position truth data accompanied by first time stamps, retrieving the GNSS signal spectrum accompanied by second time stamps and correlating the first and second time stamps.

16. The system of claim 8 further including:
capturing assistive position data from a scenario generator that creates a real world GNSS scenario from recorded position truth data via a service mobile location center (abbreviated SMLC) server that configures corresponding assistive position data elements and delivers them to the DUT during the A-GNSS session.

17. An article of manufacture that includes non-transitory processor readable storage with processor executable code for testing A-GNSS performance of a user equipment, including:
replaying to a device under test (abbreviated DUT) a recorded GNSS signal spectrum previously captured during a drive, which is correlated with position truth data that represents a true position of a GNSS receiver that captured the GNSS signal during the drive; and
performing an A-GNSS session with DUT during the replaying, including generating assistive position data from the position truth data correlated with the replaying.

18. An article of manufacture that includes non-transitory processor readable storage with processor executable code for testing A-GNSS performance of a user equipment, including:
capturing radio frequency signals from GNSS constellation satellites while following a route and logging correlated position truth data along the route from a GNSS receiver;
replaying to a device under test (abbreviated DUT) the captured radio frequency signals while conducting an A-GNSS session with the DUT, including supplying to the DUT correlated assistive position data generated from the correlated position truth data.

19. An article of manufacture that includes non-transitory processor readable storage with processor executable code for testing a user equipment in a simulated A-GNSS environment, including:
testing operational performance a device under test (abbreviated DUT) in laboratory by replaying to the DUT previously captured GNSS signal spectrum captured during a drive along with generated position assistive data that matches a vehicle trajectory captured during the drive.

20. The article of manufacture of claim 17 further including:
converting the recorded GNSS signal spectrum from digital samples to an intermediate frequency signal and then up converting the intermediate frequency to GNSS frequencies that are replayed to the DUT.

21. The article of manufacture of claim 17 further including:
exchanging a synchronization signal between a GNSS record and playback system and a network emulator to maintain the correlation between the replay and the A GNSS session.

22. The article of manufacture of claim 17 further including:
matching the position truth data's recorded location with the correlated true position of the GNSS record and playback system by retrieving the position truth data from storage sectors interleaved with other storage sectors used to store the GNSS signal spectrum captured during the drive.

23. The article of manufacture of claim 17 further including:
   matching the position truth data's recorded location with the correlated true position of the GNSS record and playback system by retrieving the position truth data accompanied by first time stamps, retrieving the GNSS signal spectrum accompanied by second time stamps and correlating the first and second time stamps.

24. The article of manufacture of claim 17 further including:
   capturing assistive position data from a scenario generator that creates a real world GNSS scenario from recorded position truth data via a service mobile location center (abbreviated SMLC) server that configures corresponding assistive position data elements and delivers them to the DUT during the A-GNSS session.

* * * * *